United States Patent [19]

Potkay

[11] 4,435,199
[45] Mar. 6, 1984

[54] EXHAUST SYSTEM FOR A VAPOR DEPOSITION CHAMBER

[75] Inventor: Eugene Potkay, Hamilton Township, Mercer County, N.J.

[73] Assignee: Western Electric Co., Inc., New York, N.Y.

[21] Appl. No.: 371,630

[22] Filed: Apr. 26, 1982

[51] Int. Cl.³ ............................................. C03C 25/02
[52] U.S. Cl. ..................................... 65/3.12; 65/13; 65/18.2; 65/144; 55/1; 55/441; 138/44
[58] Field of Search .................... 55/1, 441, 468, 418; 65/3.12, 11.1, 27, 13, 335, 18.2, 144; 138/44; 417/165, 155, 166; 73/716, 736

[56] References Cited

U.S. PATENT DOCUMENTS

| | | | |
|---|---|---|---|
| 1,385,884 | 7/1921 | Moss | 417/165 |
| 1,420,217 | 6/1922 | Richards | 138/44 |
| 1,483,229 | 2/1924 | Maclachlan | 98/115 R |
| 1,639,179 | 8/1927 | Hamel | 261/116 |
| 1,820,530 | 8/1931 | Davies | 55/441 |
| 2,104,958 | 1/1938 | Thompson | 417/156 |
| 2,702,605 | 2/1955 | Kneass, Jr. | 55/468 |
| 2,944,386 | 7/1960 | Bertin et al. | 261/116 |
| 3,668,835 | 6/1972 | Vicard | 55/226 |
| 3,771,365 | 11/1973 | Schempp | 55/274 |
| 3,966,446 | 6/1976 | Miller . | |
| 4,062,665 | 12/1977 | Izawa . | |
| 4,135,901 | 1/1979 | Fujiwara et al. . | |
| 4,224,046 | 9/1980 | Izawa . | |
| 4,242,118 | 12/1980 | Irven . | |
| 4,261,720 | 4/1981 | Helbing . | |
| 4,367,085 | 1/1983 | Suto et al. | 65/3.12 |

FOREIGN PATENT DOCUMENTS 502001 4/1951 Belgium ............................. 55/441

*Primary Examiner*—Bernard Nozick
*Attorney, Agent, or Firm*—D. J. Kirk

[57] ABSTRACT

An exhaust system (3) for a vapor-phase axial deposition (VAD) system (5) is comprised of the serial combination of an exhaust tube (26), an outlet pipe (27), a soot collection chamber (32) and a discharge line (34). The exhaust tube (26) has a constricted central portion (48) and a flared intake (44) with a gradually turned back end (46).

4 Claims, 3 Drawing Figures

EXHAUST SYSTEM FOR A VAPOR DEPOSITION CHAMBER

TECHNICAL FIELD

The instant invention is directed to an exhaust system for a vapor deposition chamber.

BACKGROUND OF THE INVENTION

Lightguide fiber is drawn from a solid glass cylinder or preform. One particular method for fabricating such a preform is described in U.S. Pat. No. 4,224,046 to Izawa et al. which issued on Dec. 13, 1977 and has been commonly referred to as the vapor-phase axial deposition (VAD) method.

The VAD technique uses a refractory starting member, which projects into the central portion of a chamber and rotates as it is withdrawn from the chamber along its axis of rotation. A glass raw material is introduced into a high temperature portion of a flame near the tip of a torch producing a glassy particulate or soot which is directed onto the end of the refractory starting member. A substantially cylindrical, boule of soot is formed on the starting member as it is continuously withdrawn from the chamber at a rate equal to the growth rate of the soot upon the boule. The withdrawn soot boule is then subjected to an elevated temperature to consolidate the porous material into a solid, clear cylindrical lightguide preform.

In such a system only a percentage (e.g., 60-70%) of the oxides formed from the precursor material deposits as the soot boule is being formed and withdrawn. Therefore, it is necessary to have an exhaust system to remove the undeposited soot from the chamber.

Known exhaust systems typically use a tubular exhaust pipe that is connected to an exhaust hood or a system common to a filtering system that is exhausted to the atmosphere. Such exhaust techniques result in the clouding of the deposition chamber due to soot depositing on the inside surface thereof owing to the limited "draw" effected by the exhaust pipe in all regions not proximate the entrance of the tube allowing nonuniform gas flow patterns within the chamber. Additionally, substantial fluctuations in exhaust line pressure, originated from in-line blower equipment degrades the stability of the combustion flame at the output of the soot torch. Such systems also have poor reproducibility from day to day due to fluctuations in atmospheric pressure variations which can typically alter precursor delivery from the torch by 15 to 20 percent.

Thus, there is a need for a vapor deposition chamber exhaust system that can remove substantially all of the undeposited soot from the chamber while maintaining a substantially constant pressure and uniform gas flow patterns therein.

SUMMARY OF THE INVENTION

The foregoing problems have been overcome by the instant exhaust system having a hollow, substantially cylindrical, exhaust tube with a constricted central portion and a flared intake having a gradually turned back end.

DETAILED DESCRIPTION

Figure 1:
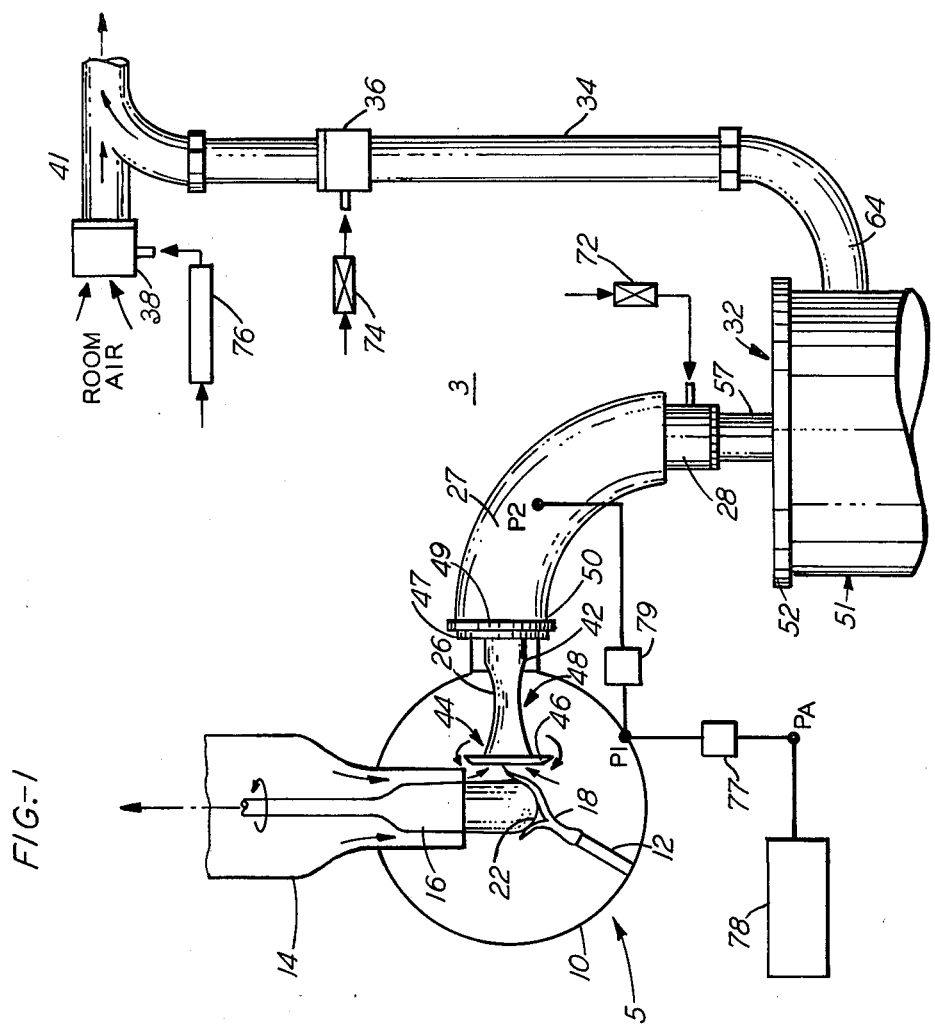
FIG. 1 is a schematic diagram of a VAD fabrication system.

FIG. 1 is a schematic drawing of the instant exhaust system 3 being used in association with a VAD system 5 which is disclosed in detail in copending patent application Ser. No. 371,629, torch by titled "Vapor-phase Axial Deposition System" by M. J. Andrejco and E. Potkay, filed on even date herewith in the U.S. Patent and Trademark Office. The aforementioned patent application is assigned to the instant assignee and is hereby incorporated by reference herein. It should be understood that the description of the instant exhaust technique used in association with a VAD system 5 is for purposes of exposition and for limitation for the technique may be used with various chambers where gas or gaseous reactants are to be removed.

The VAD system 5 is generally comprised of an enclosed chamber 10, a torch 12, an input section 14 and the instant exhaust system 3. A partially fabricated lightguide soot boule 16 is shown being rotated while being moved axially upward as reactants, passing from the torch 12 and heated in the flame 18, deposit as soot on an end 22 thereof. A particular torch 12 used in an exemplary embodiment is described in detail in copending patent application serial number 371,628 titled "A Vapor-phase Axial Deposition Torch" by M. J. Andrejco and E. Potkay filed on even date herewith, assigned to the instant assignee, and which is hereby incorporated by reference herein.

The exhaust system 3 is comprised of the serial combination of an exhaust tube 26, an outlet pipe 27, a first injection venturi 28, a soot collection chamber 32 and a discharge line 34 with a second injection venturi 36 therein. A third injection venturi 38 connected to an intake line 41 joins the discharge line 34 for connection to an exhaust hood (not shown).

Figure 2:
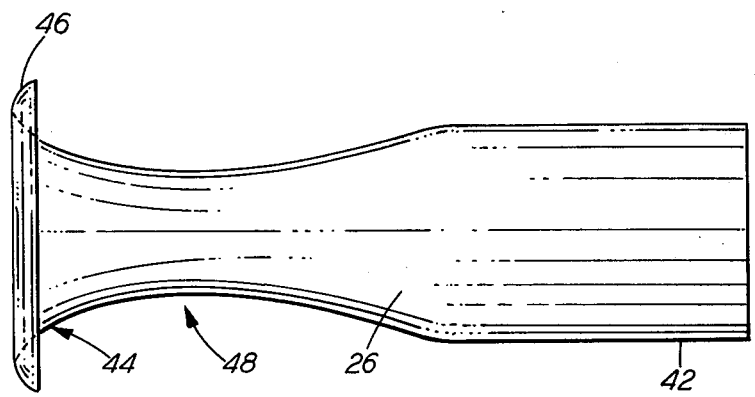
FIG. 2 is a side view of an exhaust tube used to implement the instant invention.

The exhaust tube 26 (see FIG. 2) has a substantially hollow cylindrical output end 42 and a flared intake 44 having a gradually turned back end 46. The tube 26 has a constricted throat section 48 intermediate the output end 42 and the intake 44.

The output end 42 of the exhaust tube 26 is fixedly positioned in a mounting plate 47 as shown in FIG. 1. The mounting plate 47 is sealably fastened to a flange 49 on a first end 50 of the outlet pipe 27.

Figure 3:
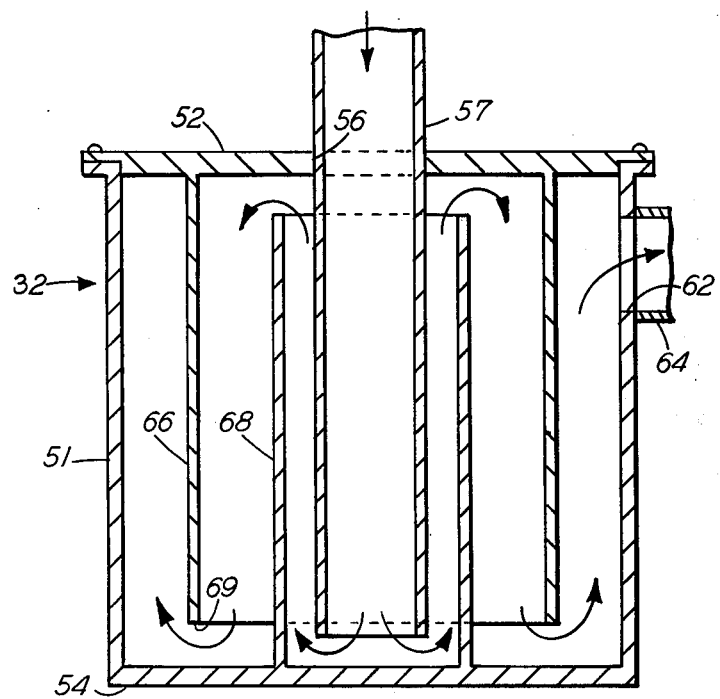
FIG. 3 is a cross-sectional view of a baffled soot collection chamber.

The soot collection chamber 32, shown in cross section in FIG. 3, is comprised of a cylindrical housing 51 having top and bottom plates 52 and 54, respectively. The top plate 52 has an opening 56 through which a pipe 57 passes and projects into the central portion of the chamber 32. The housing 51 also has an opening 62 therein to receive a first end 64 of the discharge line 34. First and second cylinders 66 and 68 are concentrically mounted within the housing 51. The first cylinder 66 is fixedly attached to, and depends from, the top plate 52 has an unattached end 69 in spaced relation with the bottom plate 54. The second cylinder 68 is fixedly mounted on the bottom plate 54 and projects upward, towards, and in spaced relation to, the top plate 52.

The injection venturies 28, 36 and 38 are of the in-line, injection type manufactured by the Nortel Machine Company, Buffalo, N.Y. (model AM-1500, glass filled Teflon polymer). Through a combination of the Bernoulli effect and momentum transfer from collisions between the high velocity gas accelerated through its orifice and stationary gas residing in the bore, the injection venturies induce a high volume flow rate of gas from one end of its bore to the other when supplied with a relatively low volume flow rate of compressed gas. An adjustable orifice allows the optimum gap to be selected for maximum performance from the injection venturies 28, 36 and 38 which provide effective means of controlling pressure levels and gas flow throughout the entire system.

Filtered compressed air is supplied to each injection venturi 28, 36 and 38 by rotameters 72, 74 and 76, respectively. The operation of the injection venturi 36 strongly influences the pressure, $P_1$, in the housing 10 while the injection venturi 28 largely determines the differential pressure $(P_1-P_2)$ between the housing at $P_1$ and the outlet pipe 27 at $P_2$. Based upon the measurement of the differential pressure the rotameter 74 may be adjusted until the desired pressure (e.g., standard atmosphere 760 mm Hg) in the chamber 10 is achieved. A pressure measuring apparatus 77 references ambient pressure $P_A$ which is monitored by a barometer 78. The differential pressure $(P_1-P_2)$, monitored by a (pressure) gauge 79 is nominally selected to a predetermined pressure by adjusting the rotameter 72 which controls the flow of gas through the injection venturi 28. The venturi 38 provides minor control of the overall pressures in the exhaust line 34 and is useful only to allow midrange biasing of the injection venturies 28 and 36.

The meters 77 and 79 and the barometer 78 may be any of those well known in the art that may be monitored visually by an operator. Alternatively, the meters 77 and 79 as well as the barometer 78 may have digital outputs connected to a computer control which provides a feedback signal to the rotameters 72, 74 and 76 to control the flow of air to the venturies 28, 36 and 38 to continuously control the pressure of the system.

In operation, the torch 12 is activated and reactants deposited to form the rotating soot boule 16 as shown in FIG. 1. The boule 16 is simultaneously rotated and withdrawn from the housing 10 through the input section 14. Inert gas such as argon or air is directed into the chamber 10 between the surfaces of the soot boule 16 and the input section 14 as indicated by the arrows. The intake 44 of the exhaust tube 26 is located proximate the rotating boule 16. The undeposited soot and gases are drawn into and through the exhaust tube 26.

It has been found that the flared intake 44 with the gradually turned back end 46 of the exhaust tube 26 is effective in removing undeposited soot located behind the flared intake which can be seen as a migration of undeposited soot flowing into the exhaust tube as indicated by the arrows. Additionally, the gradually turned back end 46 substantially eliminates turbulence of gases at the intake 44 which further enhances soot deposition on the boule 16.

The constricted throat section 48 of the exhaust tube 26 accelerates the combustion by-products and undeposited soot extracted from the deposition chamber and as a consequence, produces a forward pressure drop between the chamber 10 and the outlet pipe 27, such a positive pressure differential being necessary for an exhaust system of this type to function. Differential pressures of 1.2 to 1.3 mm H$_2$O have been attained using the instant exhaust tube 26. Additionally, the use of the exhaust tube 26 having a flared intake 44 with the gradually turned back end 46 has been found to provide uniform gaseous flow patterns within the housing 10 which is evidenced by substantial elimination of flickering of the flame 18 associated with the torch 12.

The exhausted gases and soot pass from the exhaust tube 26, through the outlet pipe 27 and the injection venturi 28 into the soot collection chamber 32. The chamber 32 performs the dual function of extracting soot from the exhaust stream while providing some degree of isolation between the chamber 10 and downstream pressure fluctuations. The soot collection chamber 32 (see FIG. 3) provides a serpentine path to the soot and exhaust gases directed therein. The exhaust gases and soot are directed axially into the chamber 32 through the outlet pipe 27 and pipe 57. The heavier soot particles will deposit on the bottom plate 54 while lighter particulate may deposit on the surfaces of the cylinders 66 and 68 as well as the inside wall of the housing 51. The exhaust gases exiting the line 34 expand radially outward and move upward, toward the top plate 52 where the gas again expands.

This process continues until the gases are finally exhausted through the opening 62 and pass into the discharge line 34. The gases, with any soot residue therein are moved through the discharge line 34, under the control of the injection venturies 36 and 38, and exit into an exhaust hood (not shown).

It is to be understood that the embodiments described herein are merely illustrative of the principles of the invention. Various modifications may be made thereto by persons skilled in the art which will embody the principles of the invention and fall within the spirit and scope thereof.

What is claimed is:

1. A method of fabricating a lightguide soot-boule in a vapor-phase axial deposition chamber, comprising the steps of:
   directing a stream of glassy soot, from a soot deposition torch, towards a growing soot-boule, to deposit at least a portion of the soot stream thereon;
   exhausting undeposited soot from the chamber through a hollow, substantially cylindrical exhaust tube having a constricted central portion with a flared intake and a gradually turned back end projecting into the chamber and an output end connected to an exhaust line; and
   removing the soot with an extracting means, connected to the exhaust line, having a plurality of tubular members mounted concentrically to provide a circuitous path to exhaust soot to extract particles therefrom while isolating the deposition chamber from downstream pressure fluctuations.

2. The method as set forth in claim 1, comprising;
   controlling the soot flow and pressure throughout the system with at least one in-line injection venturi in the exhaust line.

3. A system for exhausting soot from a vapor-phase axial deposition system, comprising:
   a chamber;
   a soot deposition torch directed into the central portion of the chamber;
   an exhaust line having first and second ends;
   a hollow, substantially cylindrical, exhaust tube having a constricted central porton with a flared intake with a gradually turned back end projecting into the chamber and an output end connected to the first end of the exhaust line; and
   a soot extraction means, connected to the second end of the exhaust line, having a plurality of tubular members mounted concentrically to provide a circuitous path to exhaust soot to extract particles therefrom while isolating the deposition chamber from downstream pressure fluctuations.

4. The exhaust system as set forth in claim 3, comprising:
at least one in-line injection venturi in the exhaust line to cause gas flow through the system while controlling pressures therein.

* * * * *